(12) United States Patent
Clemens et al.

(10) Patent No.: US 7,728,656 B2
(45) Date of Patent: Jun. 1, 2010

(54) SIGNAL INPUT CIRCUIT

(75) Inventors: Klaus Clemens, Weisweil (DE); Herbert Peusens, Brigachtal (DE); Veit Armbruster, St. Georgen (DE)

(73) Assignee: Thomson Licensing, Boulogne-Billancourt (FR)

( * ) Notice: Subject to any disclaimer, the term of this patent is extended or adjusted under 35 U.S.C. 154(b) by 67 days.

(21) Appl. No.: 11/663,937

(22) PCT Filed: Sep. 9, 2005

(86) PCT No.: PCT/EP2005/054485

§ 371 (c)(1),
(2), (4) Date: Oct. 1, 2007

(87) PCT Pub. No.: WO2006/037709

PCT Pub. Date: Apr. 13, 2006

(65) Prior Publication Data

US 2008/0211564 A1  Sep. 4, 2008

(30) Foreign Application Priority Data

Oct. 1, 2004  (DE) .................. 10 2004 047 871

(51) Int. Cl.
*H03B 1/00* (2006.01)
(52) U.S. Cl. ...................................... 327/553
(58) Field of Classification Search ............... 327/552, 327/553, 554, 555, 558
See application file for complete search history.

(56) References Cited

U.S. PATENT DOCUMENTS 4,499,495 A  2/1985  Strammello (Continued)

FOREIGN PATENT DOCUMENTS

GB  207441  11/1923

OTHER PUBLICATIONS

K. Miyatsuki et al: "A GAAS Single Voltage Controlled RF Switch IC", IEICE Transactions on Electronics, Electronics Society, Tokyo, JP, vol. E78-C, No. 8, Aug. 1, 1995, pp. 931-935.

(Continued)

*Primary Examiner*—Jeffrey S Zweizig
(74) *Attorney, Agent, or Firm*—Robert D. Shedd; Jeffrey M. Navon

(57) ABSTRACT

A circuit for breaking a signal path has not only a switching means but also a low-pass or bandpass filter whose frequency characteristic is switchable or bypassable. The insulation between the input and the output when the switching means is open, which decreases with frequency in the case of ordinary switching means, is compensated for by the filter which is then connected. In one embodiment of the circuit, an out-of-band signal is applied to the circuit in addition to the useful signal. The out-of-band signal is intended to be supplied permanently to an evaluation circuit, regardless of the switching position of the switching means. To this end, the out-of-band signal is tapped off downstream of the filter, and the filter is designed such that the out-of-band signal can pass through the filter. In the case of a circuit for selecting one of two inputs, at least one of the inputs is provided with a switchable or bypassable filter, and the switching means is a selection means. Even when the input is not selected, an out-of-band signal is forwarded to an evaluation circuit. To this end, the out-of-band signal, as described above, is tapped off downstream of the filter and upstream of the selection means.

9 Claims, 3 Drawing Sheets

U.S. PATENT DOCUMENTS

| | | | |
|---|---|---|---|
| 4,745,371 A * | 5/1988 | Haine | 331/1 A |
| 5,182,478 A * | 1/1993 | Nomura | 327/553 |
| 5,914,633 A * | 6/1999 | Comino et al. | 327/553 |
| 5,917,362 A | 6/1999 | Kohama | |
| 5,956,075 A | 9/1999 | Matsuo | |
| 6,591,087 B1 * | 7/2003 | Oda | 455/78 |
| 6,606,483 B1 * | 8/2003 | Baker et al. | 455/126 |
| 7,095,816 B2 * | 8/2006 | Kishine et al. | 375/355 |
| 7,339,442 B2 * | 3/2008 | Godambe | 331/135 |
| 7,443,269 B2 * | 10/2008 | Chow et al. | 333/186 |
| 2004/0031064 A1 | 2/2004 | Lindstrom | |
| 2004/0168200 A1 | 8/2004 | Richter | |

OTHER PUBLICATIONS

Search Report Dated Dec. 21, 2005.

* cited by examiner

SIGNAL INPUT CIRCUIT

This application claims the benefit, under 35 U.S.C. §365 of International Application PCT/EP2005/054485, filed Sep. 9, 2005, which was published in accordance with PCT Article 21(2) on Apr. 13, 2006 in English and which claims the benefit of German patent application No. 102004047871.6, filed Oct. 1, 2004.

Signal-processing appliances usually have signal inputs from which the signal applied to the signal inputs is forwarded to circuits for signal processing. If the signal input can be disconnected, there is normally a switch in the signal path from the signal input to the signal-processing circuit. The switches which break the signal path often provide decoupling between the isolated signal paths when the switch is open, said decoupling decreasing as frequency increases. This means that signals at relatively high frequencies reach the components downstream of the switch despite the signal path being interrupted by the switch. The propagation paths may include capacitive or inductive coupling, for example. To bring about better insulation between the signal input of the signal-processing appliance and the signal-processing circuit, the switching means for breaking the signal path are frequently cascaded. The problem of insulation decreasing as frequency increases exists in the same way in circuits which have a plurality of signal inputs which are changed over. Cascading switching means for breaking signal paths or for changing over signal inputs is associated with an unwanted relatively high level of circuit complexity. It is therefore desirable to reduce the circuit complexity for breaking signal paths or for changing over between signal inputs. At the same time, it is desirable to obtain improved insulation between the input and the output of the switching means or of the selection means for relatively high frequencies.

A signal input circuit having the desired properties is specified in Patent claim 1. Advantageous refinements and developments of the invention are specified in the subclaims.

A signal input circuit based on the invention has a first switching means controlled by a first control signal. The first switching means is arranged in the signal path between an input and an output of the circuit. From the output of the circuit, a signal applied to the circuit is sent to a signal-processing circuit when the first switching means is closed. Arranged upstream of the first switching means is a filter, whose filter characteristic can be changed over on the basis of a second control signal. The filter is a low-pass filter or a bandpass filter, for example.

In another embodiment of the invention, a first useful signal is forwarded via the input of the circuit to the connected signal-processing circuit. In one embodiment of the inventive circuit, not only the first useful signal but also a further signal is transmitted, said signal being forwarded to a further circuit for signal processing even when the signal path has been interrupted. This further signal, which is subsequently called the out-of-band or OOB signal, has a lower frequency than the useful signal, for example. Known OOB signals for TV cable connections are in a frequency range between 70 and 130 MHz, for example. The filter arranged upstream of the switching means can have its filter characteristics changed over, as described above. In this case, with the signal path closed, the selected characteristic of the filter is linear, for example, over the entire frequency range forwarded to the signal-processing circuit. With the first switching means open and hence the signal path interrupted, the filter's characteristic corresponds to that of a low-pass filter or a bandpass filter, for example. The frequency range of the filter when the signal path is interrupted is chosen such that the out-of-band signal is passed through and other frequencies, particularly higher frequencies, are suppressed. Depending on the nature of the first useful signal and of the out-of-band signal, it is also possible for the frequency ranges to overlap. In any case, the filter is designed such that the out-of-band signal is passed. In this context, it is also conceivable for the upper cut-off frequency of the filter to be below the maximum frequency of the out-of-band signal, so that the out-of-band signal is in the region of the falling filter edge and is forwarded in attenuated form. The decreasing insulation of the first switching means for breaking the signal path at increasing frequencies is thus compensated for or overcompensated for by the increasing signal attenuation of the filter at higher frequencies.

In another embodiment of the inventive circuit, the first switching means is a selection means controlled by the first control signal. Besides the first input, the circuit has a second input, and the selection means selects a signal from the first or second input and forwards it to the connected signal-processing circuit. The signals at the first and second inputs are broadcast radio signals, for example, which are provided via an antenna or via a cable connection. A first of the inputs, for example the TV cable connection, is used to apply an out-of-band signal, transmitted in addition to a first useful signal, to the appliance. Even if a second useful signal, applied to the second input by an antenna, for example, is forwarded to the signal-processing circuit, the additional out-of-band signal provided via the first input needs to be forwarded to a further circuit part. To this end, the out-of-band signal is tapped off downstream of the filter and is applied to the further circuit part. Frequencies above the out-of-band signal are suppressed by the filter. There is thus compensation or overcompensation for the decreasing insulation of the selection means at higher frequencies for the respectively unselected signal.

In one embodiment of the inventive circuit, the filter is bypassed by means of a second switching means controlled by a second control signal when the corresponding input is selected or when the signal path is closed. The filter is thus inactive and the entire frequency range is transmitted to the connected signal-processing circuit.

In one embodiment of the invention, the second control signal corresponds to the first control signal, i.e. the second control signal is controlled by the same control signal as the first switching means or the selection means, respectively, in the further embodiment of the invention.

In a further development of the invention, the filter has an amplifier connected downstream of it. In another further development, the maximum operating frequency of the amplifier is selectable. In line with the invention, the maximum operating frequency of the amplifier is chosen such that when the signal path is closed or when the signal has been selected the full required operating frequency is set and when the signal path is open or when the signal has not been selected the maximum operating frequency is reduced such that only the out-of-band signal is amplified to a sufficient extent. The amplifier comprises a transistor, for example. The maximum transit frequency of the transistor, which determines the maximum operating frequency of the amplifier, can be controlled using the operating point of the amplifier. The operating point of the transistor is selected using the setting of the base current, for example. In this case, the base current is controlled by a third control signal such that when the signal path is closed or when the signal has been selected a high maximum operating frequency is selected.

Within the context of the invention, the first, second and third control signals may be identical, or may be derived from a single control signal. The switching means are switching means designed using relays, diodes or RF transistors, for example, and also include integrated switches.

The invention will be described in more detail below with reference to the drawing, in which.

In the figures, identical or similar elements have been provided with identical reference symbols.

Figure 1:
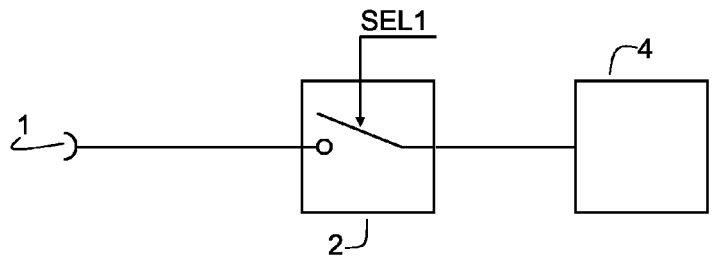
FIG. 1 shows a schematic illustration of a known circuit for interrupting the signal path.

FIG. 1 shows a schematic illustration of an appliance for processing a signal, in which the signal path can be interrupted. The circuit known from the prior art has an input 1 and a first signal-processing circuit 4. Arranged between the input 1 and the first signal-processing circuit 4 for the purpose of selectively interrupting the signal path is a switching means 2 controlled by a control signal SEL1. Depending on the control signal SEL1, the input 1 is connected to the first signal-processing circuit 4 or the signal path is interrupted. The insulation of the input 1 from the first signal-processing circuit 4 is determined by the properties of the switching means 2. This applies particularly to the dependence of the insulation on the signal frequency.

Figure 2:
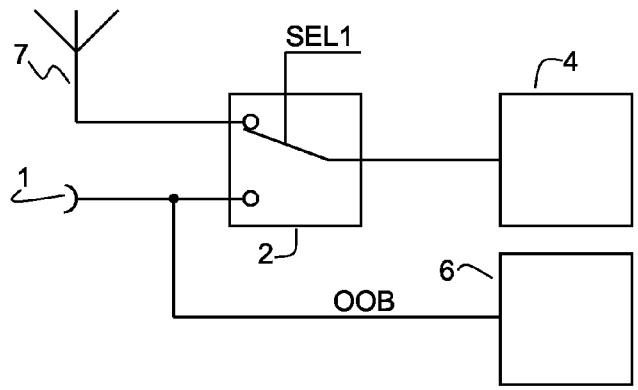
FIG. 2 shows a schematic illustration of a known selection circuit for selecting one of two signals.

FIG. 2 shows a circuit for selecting one of two inputs, as is known from the prior art. As in FIG. 1, there are a first input 1 and a first signal-processing circuit 4. The switching means 2 from FIG. 1 is in this case a selection means 2 which selects between the first input 1 and a second input 7. The control signal SEL1 determines which of the two inputs 1, 7 is connected to the first signal-processing circuit 4. The first input 1 is used to supply not only a first useful signal but also a further signal OOB. The further signal OOB is applied to a second signal-processing circuit 6. The OOB signal is used to provide an additional service, for example. The additional service needs to be permanently available, regardless of the current switching position of the selection means 2. For this reason, the signal OOB is applied permanently to the second signal-processing circuit 6 regardless of the selection of the selection means 2. The arrangement shown schematically in the figure has the risk that the first useful signal, which is applied to the first input 1 in addition to the further signal OOB, will propagate via the lines or conduction tracks in the circuit and will be coupled into other circuit parts. The propagation is effected by means of capacitive or inductive coupling or by means of electromagnetic radiation to other components, for example. In addition, the insulation of the selection means 2 between the unselected input and the output decreases as frequency increases. The relatively high frequencies of the first useful signal applied to the first input may in this case reach the output of the selection means 3 as interference signals and may disturb the selected second useful signal from the other input of the selection means. These disturbances are unwanted particularly when the signal sources connected to the inputs deliver signals having very different levels.

Figure 3:
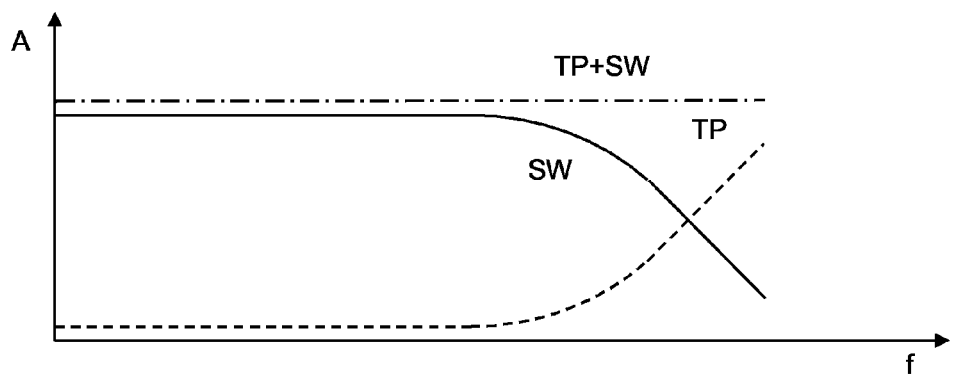
FIG. 3 shows a general representation of the damping profiles over frequency for a typical switching means and a low-pass filter.

FIG. 3 shows exemplary schematic frequency responses for the damping of a switching means SW and of a low-pass filter TP for a frequency range. When the low-pass filter and the switching means are connected in series, damping which remains constant over frequency is obtained for the characteristic curves shown in the figure. The total damping obtained as a result of connecting the low-pass filter TP and the switching means SW in series is indicated as a dash-dot line TP+SW.

Figure 4:
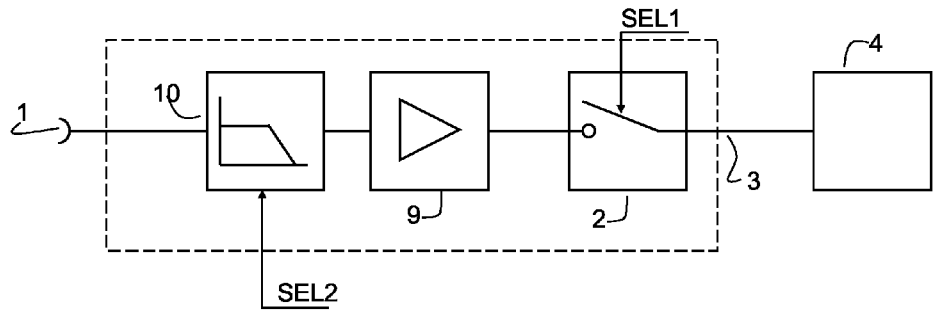
FIG. 4 shows a first inventive circuit for interrupting a signal path.

FIG. 4 shows a first embodiment of an inventive circuit for interrupting a signal path. The circuit has an input 1 and a signal-processing means 4. In addition, there is a first switching means 2 controlled by a control signal SELL. Arranged between the input 1 and the first switching means 2 is a filter 10 whose characteristic can be changed over by a control signal SEL2. When the first switching means 2 is closed, the frequency characteristic of the filter 10 is chosen such that the desired signals applied to the input 1 reach the signal-processing circuit 4 unattenuated. When the switching means 2 is open, the frequency characteristic of the filter 10 is set such that the damping of the switching means 2, which decreases as frequency increases, is at least compensated for. In a further embodiment of the inventive circuit, the filter 10 has an amplifier 9 connected downstream of it.

Figure 5:
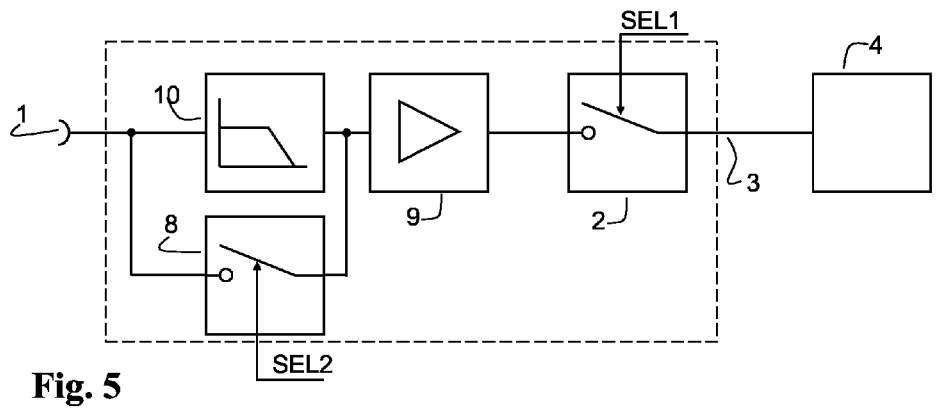
FIG. 5 shows a further embodiment of an inventive circuit for interrupting a signal path.

FIG. 5 shows a second embodiment of the inventive circuit for interrupting a signal path. The circuit shown in the figure corresponds essentially to the circuit from FIG. 4. Unlike the previously described circuit, the filter 10 cannot have its frequency characteristic changed over, but rather can be bypassed using a second switching means 8. The second switching means 8 is controlled by a control signal SEL2. When the first switching means 2 is closed, the second switching means 8 is actuated such that the filter 10 is bypassed. The signal applied to the input 1 now reaches the signal-processing circuit 4 unattenuated. In the circuit shown in FIG. 5, too, one embodiment has an amplifier 9 which is arranged between the filter 10 and the first switching means 2.

Figure 6:
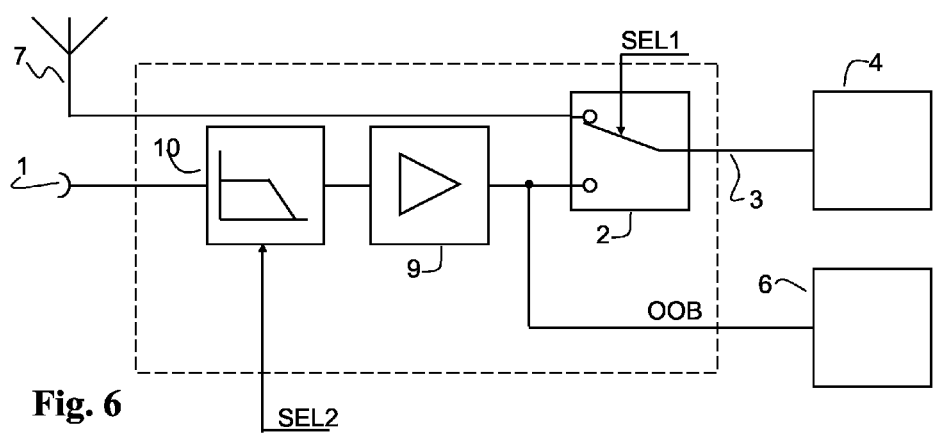
FIG. 6 shows a first embodiment of an inventive circuit for selecting one of two signals.

FIG. 6 shows a first embodiment of an inventive circuit for selecting one of two signal inputs. In this case, a first input 1 and a second input 7 are connected to a selection means 2. From the selection means 2, which is controlled by means of a control signal SEL1, the signal from the respective selected input passes to a signal-processing circuit 4. Arranged between the first input 1 and the corresponding input of the selection means 2 is a filter 10 whose frequency characteristic can be changed over. The filter 10 is controlled by a control signal SEL2. When the first input 1 has been selected by the selection means 2, the frequency characteristic of the filter 10 is chosen such that the signals from the input 1 reach the signal-processing circuit 4 unattenuated. The further signals OOB transmitted with the useful signal are tapped off upstream of the input of the selection means 2 and are applied to a second signal-processing circuit 6. When the second input 7 has been selected by the selection means 2, the frequency characteristic of the filter 10 is selected such that the further signal OOB transmitted with the useful signal can pass through the filter 10. Since the signal OOB is tapped off upstream of the input of the selection means 2, it reaches the further signal-processing means 6 even when the input is not selected. If the filter 10 is a low-pass filter, frequencies above the signal frequency of the signal OOB are attenuated. The frequency of the OOB signal is in a band from 70 to 130 MHz, for example. With an appropriately designed filter, frequencies above 130 MHz are thus attenuated. If the filter 10 is an appropriately designed bandpass filter, frequencies below the signal frequency of the signal OOB can also be attenuated. In one embodiment of the inventive circuit, an amplifier 9 is provided downstream of the filter 10.

Figure 7:
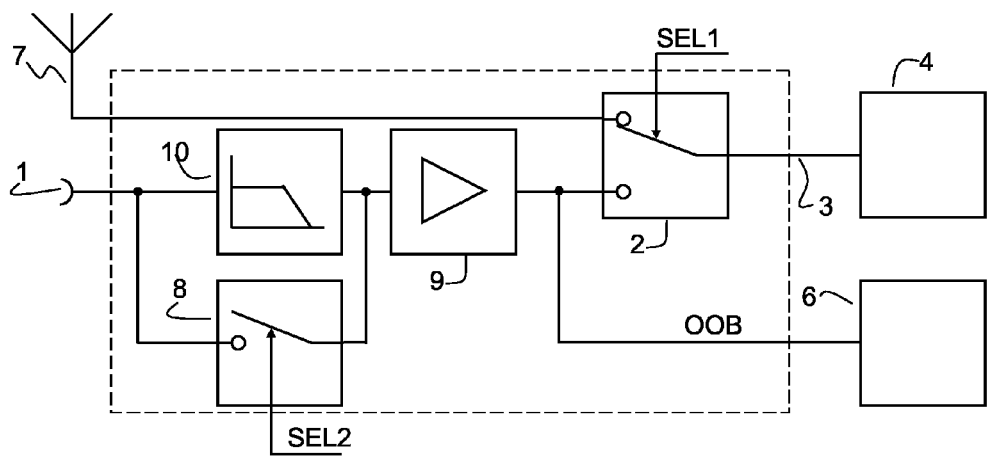
FIG. 7 shows a second embodiment of an inventive circuit for selecting one of two signals.

FIG. 7 shows a second embodiment of an inventive circuit for selecting one of two signal inputs. The circuit corresponds essentially to the circuit from FIG. 6. Unlike the circuit shown in FIG. 6, the filter 10 cannot have its frequency characteristic changed over, but rather can be bypassed using a second switching means 8. The second switching means 8 is controlled by a control signal SEL2. When the first signal input 1 is selected, the second switching means 8 is actuated such that the filter 10 is bypassed. The signal applied to the input 1 then reaches the signal-processing circuit 4 unattenuated. In the circuit shown in FIG. 7, too, one embodiment has an amplifier 9 which is arranged between the filter 10 and the first selection means 2.

Figure 8:
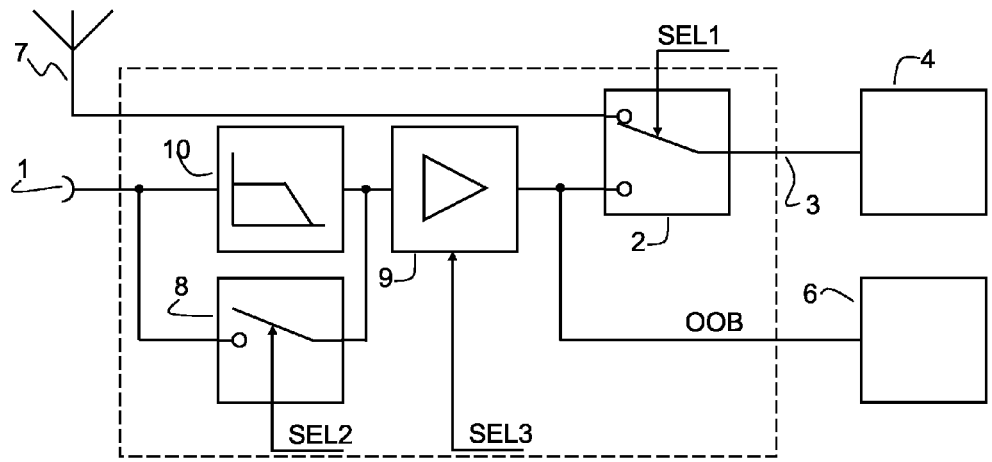
FIG. 8 shows a third embodiment of an inventive circuit for selecting one of two signals.

FIG. 8 shows a third embodiment of an inventive circuit for selecting one of two signal inputs. The circuit corresponds essentially to the circuit from FIG. 7. In addition to the features described in FIG. 7, in this circuit the maximum operating frequency of the amplifier 9 can be selected using a control signal SEL3. In this case, the maximum operating frequency of the amplifier is chosen such that it corresponds to the maximum frequency of the useful signal when the first input 1 is selected. When the second input 7 is selected, it is sufficient for the maximum operating frequency to correspond to that of the further signal OOB.

Arranging the amplifier 9 downstream of the filter 10 and upstream of the switching means 2 has the advantage that the frequency range of the signals to be amplified is already reduced. This allows a further reduction in the unwanted signal coupling. In principle, however, it is also possible to arrange the amplifier 9 upstream of the filter 10.

Figure 9:
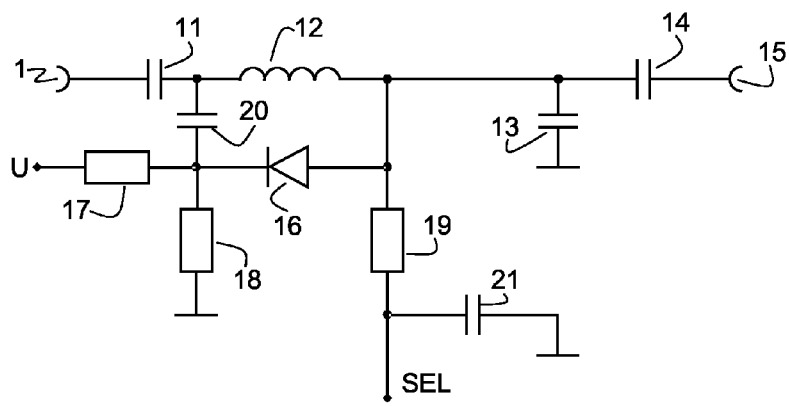
FIG. 9 shows an exemplary detailed circuit for a bypassable low-pass filter.

FIG. 9 shows an exemplary detailed circuit for a bypassable low-pass filter. From a signal input 1, a signal is first passed to a coupling capacitor 11. An inductance 12 and a capacitance 13 form the actual low-pass filter. The filtered signal is output via a coupling capacitor 14 and is available at an output 15. A switching diode 16 is connected in parallel with the inductance 12 via a capacitor 20. If the capacitance 20 is sufficiently high, the diode 16 is in parallel with the inductance 12 and bypasses it when turned on. A voltage U is applied to the cathode of the switching diode 16 via a resistor 17. A resistor 18 and the resistor 17 form a voltage divider which can be used to set the potential on the cathode of the switching diode 17. A control voltage SEL is applied to the anode of the switching diode 16 via a resistor 19. A capacitance 21 smooths the control voltage SEL. Depending on the magnitude of the control voltage SEL, the switching diode is forward or reverse biased. When the switching diode is forward biased, i.e. conducting, the inductance is bypassed and the low-pass filter is inactive. The signal now reaches the output via the switching diode 16 and the coupling capacitance 14. When the switching diode 16 is reverse biased, i.e. non-conducting, the inductance 12 is in the signal path and the low-pass filter is active.

The invention claimed is:

1. A signal input circuit having first switching means controlled by a first control signal and arranged in series in a signal path between a first input and a first output of the circuit, the first switching means selectively closing or opening the signal path between the first input and the first output, the first output being connected to a first signal processing circuit, wherein, upstream of the first switching means, and in series with the first switching means and the first input, a filter is arranged in the signal path, which filter can be changed over between a first filter characteristic and a second filter characteristic in response to a second control signal, wherein both filter characteristics pass at least a portion of an input signal at any time.

2. The circuit of claim 1, wherein the circuit has a second input that is independent from the first input, and wherein the first switching means is a selection means controlled by the first control signal, selectively coupling the first or the second input to the first output.

3. The circuit of claim 1, wherein the filter is provided with a switching means for selectively bridging the filter, switching means for bridging the filter being controlled by the second control signal, and the opening or closing of the switch effectively providing the changeover in the filter characteristics.

4. The circuit of claim 1, wherein the second control signal corresponds to the first control signal.

5. The circuit of claim 1, wherein an amplifier is connected in series with the filter.

6. The circuit of claim 5, wherein the maximum operating frequency of the amplifier is selectable.

7. The circuit of claim 6, wherein the amplifier is supplied with a third control signal for selecting the maximum operating frequency.

8. The circuit of claim 1, wherein the signal applied to the first input is be tapped off downstream of the filter, upstream of the first switching means, and is provided at a second output of the circuit that is independent from the first output, and wherein the signal tapped off downstream of the filter is provided to the second output and to the input of the first switching means in parallel.

9. Receiver for modulated RF signals having a circuit according to claim 1.

* * * * *